United States Patent
Sarin

(10) Patent No.: US 9,870,180 B2
(45) Date of Patent: Jan. 16, 2018

(54) PRINT INTERFACE TECHNOLOGY AGNOSTIC DATA LOSS PREVENTION THROUGH PRINT OPERATIONS

(71) Applicant: Symantec Corporation, Mountain View, CA (US)

(72) Inventor: Sumit Sarin, Pune (IN)

(73) Assignee: Symantec Corporation, Mountain View, CA (US)

( * ) Notice: Subject to any disclaimer, the term of this patent is extended or adjusted under 35 U.S.C. 154(b) by 4 days.

(21) Appl. No.: 15/069,795

(22) Filed: Mar. 14, 2016

(65) Prior Publication Data

US 2017/0262236 A1    Sep. 14, 2017

(51) Int. Cl.
*G06F 3/12* (2006.01)

(52) U.S. Cl.
CPC .......... *G06F 3/1238* (2013.01); *G06F 3/123* (2013.01); *G06F 3/1222* (2013.01); *G06F 3/1246* (2013.01); *G06F 3/1276* (2013.01); *G06F 3/1288* (2013.01); *G06F 3/1294* (2013.01)

(58) Field of Classification Search
CPC ...... G06F 3/1238; G06F 3/1222; G06F 3/123; G06F 3/1246; G06F 3/1276; G06F 3/1288; G06F 3/1294; G06F 2212/1032; G06F 2212/1052
USPC ........................................................ 358/1.15
See application file for complete search history.

(56) References Cited

U.S. PATENT DOCUMENTS

2010/0146269 A1* 6/2010 Baskaran ................ G06F 21/10
                                                          713/165
2012/0151551 A1* 6/2012 Readshaw ............... G06F 21/55
                                                          726/1

OTHER PUBLICATIONS

International Search Report and Written Opinion for PCT/US2016/068530, mailed on Feb. 17, 2017, 7 pages.

* cited by examiner

*Primary Examiner* — Neil R McLean
(74) *Attorney, Agent, or Firm* — Patent Law Works LLP

(57) ABSTRACT

Print operations are monitored and a DLP policy is applied, independently of the print interface technology used by applications that initiate print operations. A DLP component monitors for and detects print drivers being loaded into the print spooler. When a print driver is loaded, the print spooler creates a corresponding driver object, which is intercepted. The instantiated driver object creates multiple device objects to carry out various print functions. The device object print functions of interest are intercepted. Attempts to send text to the printer at a print driver level by intercepted device object functions are monitored, and application level context information is identified, such as the associated 0user. The DLP policy is applied to monitored attempts to send text to the printer at the print driver level, taking into account application level context information and the specific text of the monitored attempt.

20 Claims, 3 Drawing Sheets

PRINT INTERFACE TECHNOLOGY AGNOSTIC DATA LOSS PREVENTION THROUGH PRINT OPERATIONS

TECHNICAL FIELD

This disclosure pertains generally to computer security and data loss prevention, and more specifically to print interface technology agnostic data loss prevention through print operations.

BACKGROUND

With the widespread use of cloud based storage and mobile computing devices, enterprises and other organizations are subject to loss and leakage of their sensitive information, as a result of both inadvertent and malicious user activity. Data Loss Prevention ("DLP") systems can monitor, detect and block operations on sensitive information when it is accessed, transmitted and stored. By doing so, DLP systems can protect sensitive information according to an organizational policy. For example, within a given company certain members of the Human Resources department may be authorized to access personal employee information such as home addresses and social security numbers. However, printing such personal employee information or copying it to non-company cloud storage could be a violation of company policy. DLP systems can classify specific information as sensitive, identify and monitor such information, and detect and block undesirable incidents.

Print is a unique threat vector for DLP, in which digital information is converted into a physical medium. Thus, print is an operation that is important for a DLP system to monitor. Under Microsoft Windows®, monitoring print operations was conventionally performed by intercepting Microsoft's Graphics Device Interface ("GDI") Application Program Interface ("API"). However, this only works in the case where the application in question uses GDI based printing. Windows print technology has evolved substantially over the years, and currently utilizes interface technologies such as GDI, Extensible Markup Language ("XML") Paper Specification ("XPS"), Print Ticket and Document Package APIs.

Furthermore, in some scenarios it is not practicable for a DLP system even to be aware of specific applications in order to intercept their print operations at an application level, for example with application sandboxing and code integrity checks.

It would be desirable to address these issues.

SUMMARY

Print operations are monitored and a DLP policy is applied, independently of the specific applications that initiate print operations, and independently of the specific print interface technology used by the applications. A DLP component monitors for and detects print drivers being loaded into the print spooler. This can take the form of intercepting the system function that loads print drivers into the print spooler (e.g., the Windows system function LoadLibrary). In one embodiment, a print hook is injected into the print spooler, and the print hook intercepts the relevant system function. In another embodiment, the print hook code is registered as a print driver, causing Windows to load the print hook code into the print spooler. The print hook code running in the spooler as a driver then intercepts the relevant system function. By intercepting the relevant system function (e.g., LoadLibrary), the loading of any print driver into the spooler is detected (e.g., from folder System32\spool\drivers).

When a print driver is loaded into the print spooler, the print spooler creates a corresponding driver object. The creation of the driver object is intercepted, for example by intercepting the DllGetClassObject method of the loaded print driver, and intercepting the IClassFactory.CreateInstance method to hook the created driver object. The instantiated driver object creates multiple device objects to carry out various print functions. When the driver object creates device objects, the device object print functions of interest are intercepted. This can take the form of intercepting the driver object method which exports the table of driver functions, when the print spooler is instantiating the driver object through method IClassFactory.CreateInstance. When the print spooler fetches the table, specific table entries of interest are replaced. The device object print functions of interest can vary between embodiments, but typically include device object print functions associated with transmitting content to the printer, such as those responsible for line and page level output and for state management. In one embodiment, StartDoc, EndDoc, TextOut, SendPage, Start Banding and Next Band are intercepted.

Attempts to send text to the printer at a print driver level by the intercepted device object functions are monitored. This can comprise monitoring text a page at a time, whenever an intercepted device object print function is called to send a page to the printer. Where the content being processed at this level is in glyph format, the glyphs can be converted to Unicode.

For each monitored attempt to send specific text to the printer, application level context information associated with the specific application that initiated the underlying print operation is identified. In one embodiment, the remote procedure call ("RPC") API is intercepted, and it is detected when the print spooler makes an RPC impersonation print call. When this occurs, the application ID that the print spooler passed to the intercepted RPC impersonation print call is read. From this, additional application level context information can be determined, such as the associated user, and the governing DLP policy.

The DLP policy is applied to monitored attempts to send specific text to the printer at the print driver level. The application of the DLP policy to each specific monitored attempt can take into account specific identified application level context information and the specific text of the monitored attempt. Applying the DLP policy can further include taking actions such as blocking an attempt to send content to the printer, redacting restricted content but sending non-restricted content to the printer, logging an attempt to send content to the printer, sending a notification to an administrator concerning an attempt to send content to the printer, blocking additional operations for a user associated with an attempt to send content to the printer, etc. Because the monitoring occurs at the print driver level, the DLP policy can be applied to print operations regardless of which specific print interface is used by originating applications (e.g., GDI, XPS, Document Package, etc.).

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
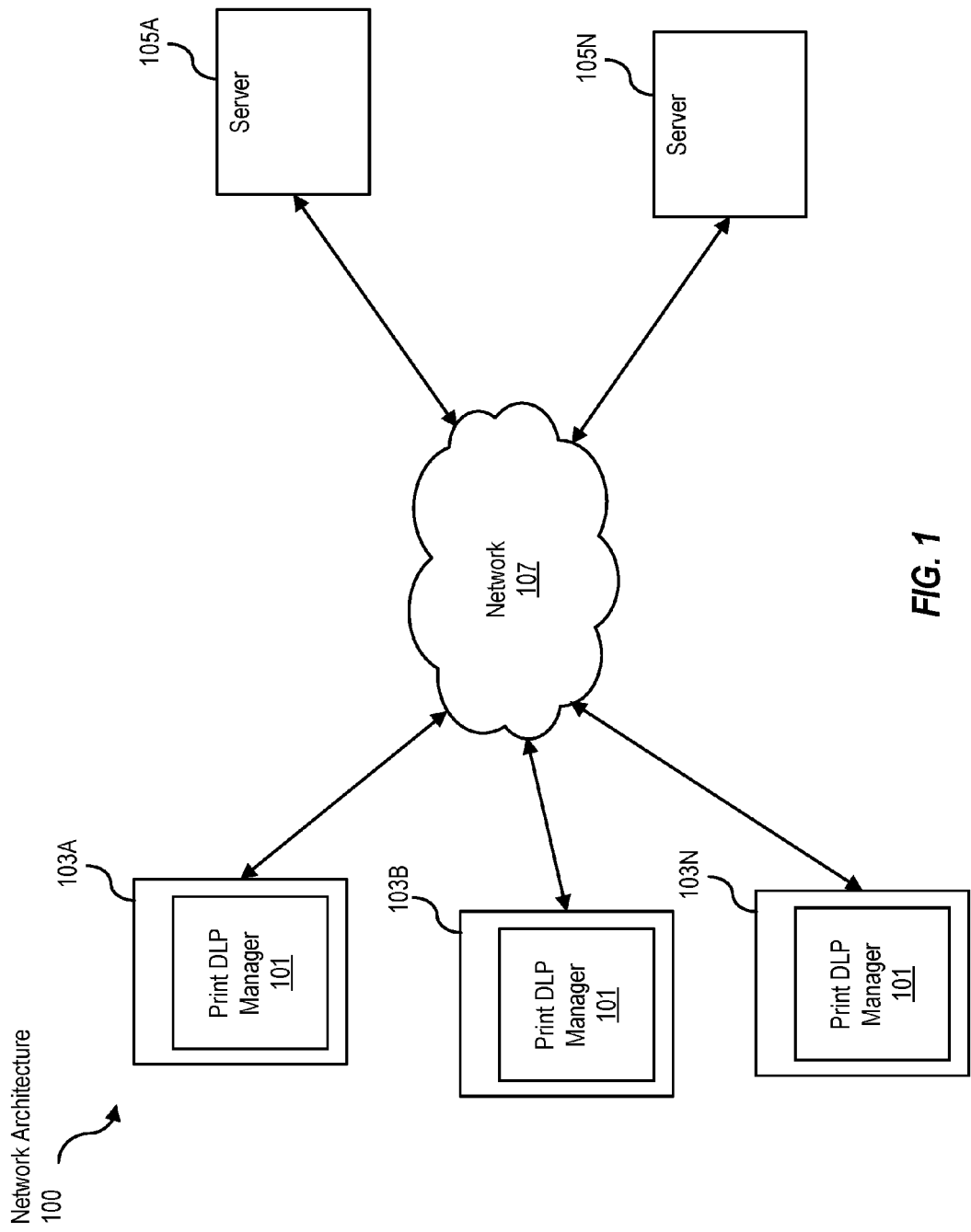
FIG. 1 is a block diagram of an exemplary network architecture in which a print DLP manager can be implemented, according to some embodiments.

FIG. 1 is a block diagram illustrating an exemplary network architecture 100 in which a print DLP manager 101 can be implemented. The illustrated network architecture 100 comprises multiple clients 103A, 103B and 103N, as well as multiple servers 105A and 105N. In FIG. 1, a print DLP manager 101 is illustrated as residing on each client 103A-C. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
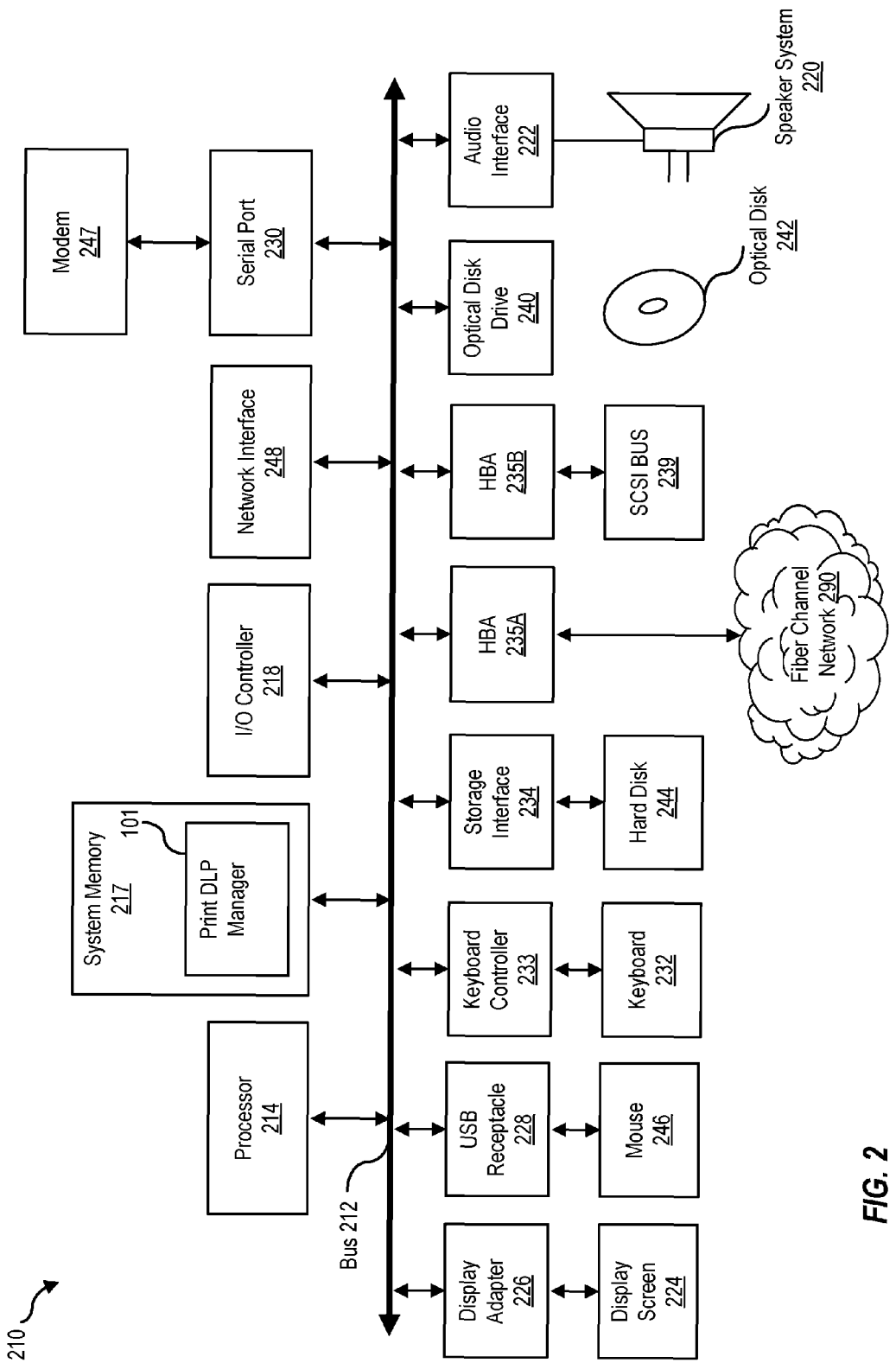
FIG. 2 is a block diagram of a computer system suitable for implementing a print DLP manager, according to some embodiments.

FIG. 2 is a block diagram of a computer system 210 suitable for implementing a print DLP manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the print DLP manager 101 is illustrated as residing in system memory 217. The workings of the print DLP manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
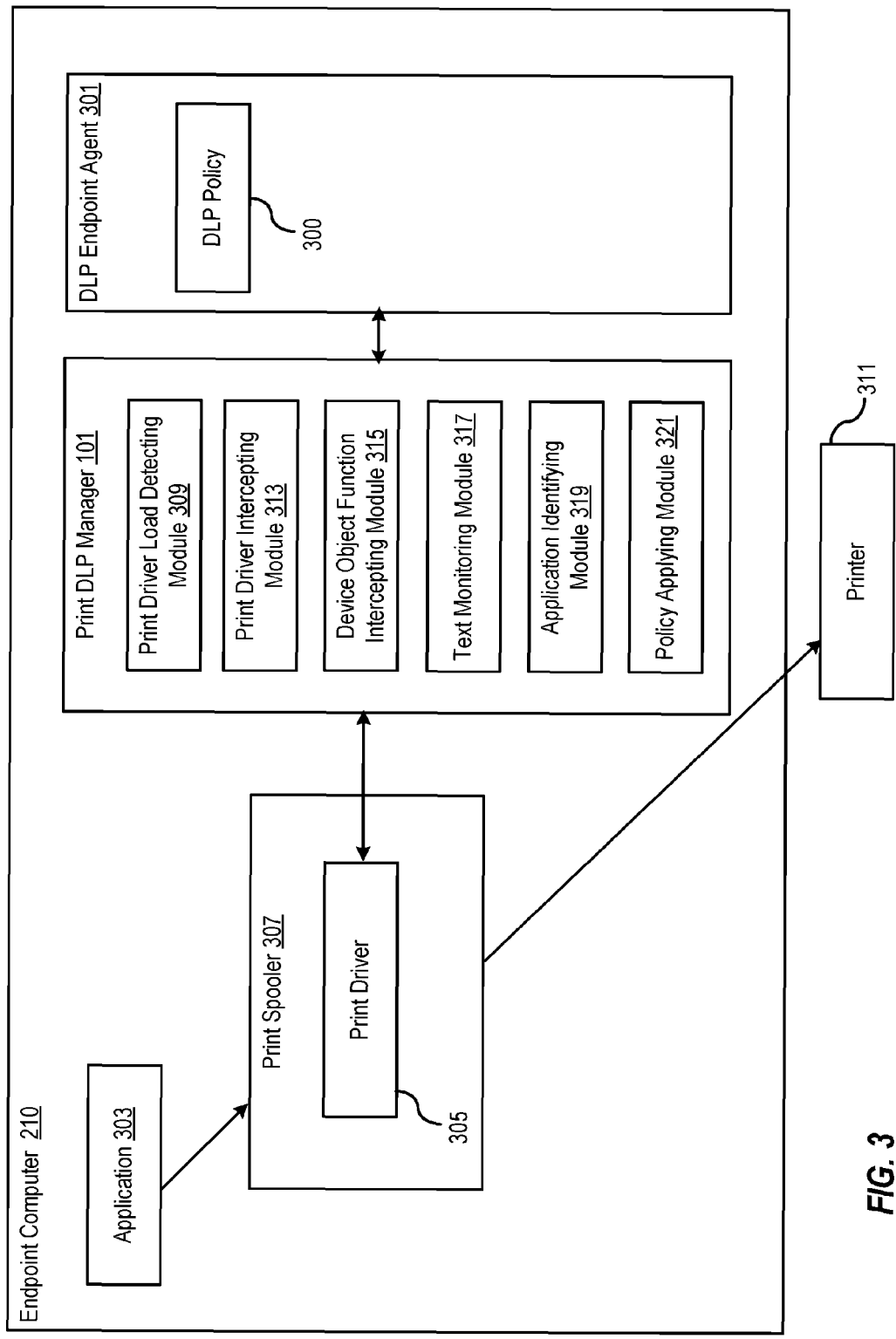
FIG. 3 is a block diagram of the operation of a print DLP manager, according to some embodiments.

FIG. 3 illustrates the operation of a print DLP manager 101, according to some embodiments. As described above, the functionalities of the print DLP manager 101 can reside on a client 103, a server 105, or be distributed between multiple computer systems 210, including within a cloud-based computing environment in which the functionality of the print DLP manager 101 is provided as a service over a network 107. It is to be understood that although the print DLP manager 101 is illustrated in FIG. 3 as a single entity, the illustrated print DLP manager 101 represents a collection of functionalities, which can be instantiated as a single or multiple modules as desired (an instantiation of specific, multiple modules of the print DLP manager 101 is illustrated in FIG. 3). It is to be understood that the modules of the print DLP manager 101 can be instantiated (for example as object code or executable images) within the system memory 217 (e.g., RAM, ROM, flash memory) of any computer system 210, such that when the processor 214 of the computer system 210 executes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the print DLP manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a print DLP manager 101 runs on an endpoint computer 210 (e.g., a client 103). FIG. 3 also illustrates a DLP endpoint agent 301. For efficiency of illustration and explanation, the print DLP manager 101 and the DLP endpoint agent 301 are illustrated as separate entities. It is to be understood that these items represent collections of functionalities, and in some embodiments the print DLP manager 101 is instantiated as a component of the DLP endpoint agent 301. Some of the functionalities described herein as being performed by or in conjunction with the DLP endpoint agent 301 can in some embodiments be performed by one or more backend DLP components (not illustrated) executing on one or more remote computers 210 (e.g., cloud based severs 105).

As described in detail below, the print DLP manager 101 monitors print operations and enforces a DLP policy 300, independently of whatever specific applications 303 initiate print operations, and independently of whatever specific print interface is used by these applications 303. To do so, the print DLP manager 101 intercepts the print driver 305 in the print spooler 307, thereby giving the print DLP manager 101 access to all content printed at a system level, below the originating applications 303. As explained in detail below, to match system level operations to their originating applications 303 and corresponding users in order to enforce a DLP policy 300, the print DLP manager 101 intercepts the remote produce call (RPC) impersonation APIs. Because an application 303 calls print via RPC and the print spooler 307 impersonates the application 303 when printing, intercepting the RPC impersonation APIs provides system level access to the ID of the application 303 that initiated a given print operation, and hence the corresponding user and relevant permissions. The print DLP manager 101 can thus monitor content being printed, and enforce the DLP policy 300 (e.g., block certain users from printing specific sensitive information at any desired level of granularity) regardless of the print platform used by the application 303, and without having to monitor specific applications 303 or even be aware of them.

More specifically, a print driver load detecting module 309 of the print DLP manager 101 monitors for and detects the loading of print drivers 305 into the print spooler 307. In one embodiment, the print driver load detecting module 309 does this by injecting a print hook into the print spooler 307. The print hook intercepts the system function that loads print drivers 305 into the print spooler 307. In Windows, this function is currently LoadLibrary, but system function names can change over time, e.g., between versions of Windows. By intercepting LoadLibrary, the print hook detects the loading of any print driver 305 into the print spooler 307, e.g., from System32\spool\drivers. In another embodiment, the print driver load detecting module 309 registers the print hook code as a print driver, which Windows then loads into the print spooler 307. This mock print driver containing the hook code proceeds to intercept Load-Library, and to detect the loading of any actual print drivers 305 into the print spooler 307. Either way, the print driver load detecting module 309 persistently loads code into the print spooler 307. This code (the injected print hook or loaded mock print driver) in turn intercepts LoadLibrary, which loads print drivers 305 into the print spooler 307. By intercepting the print driver loading function, the print driver load detecting module 309 detects whenever a print driver 305 is loaded into the print spooler 307 to send data to the printer 311, regardless of the higher level print interface technology in use (e.g., GDI, XPS, Document Package, etc.).

When a print driver 305 is loaded into the print spooler 307, the print spooler 307 creates a corresponding driver object. A print driver intercepting module 313 of the print DLP manager 101 intercepts the creation of the driver object. This can be done by intercepting a method of the loaded print driver for retrieving a class object (e.g., the DllGetClassObject method of the actual print driver 305), and intercepting a method for creating an instance of an object (e.g., the IClassFactory.CreateInstance method), to hook the driver object. It is to be understood that the methods that perform these operations can have different names, e.g., in different versions of Windows.

The instantiated driver object creates multiple device objects to carry out various print functions. A device object function intercepting module 315 of the print DLP manager 101 intercepts the device object print functions of interest for implementing the desired DLP functionality. To enable this, when the print spooler 307 is instantiating the driver object through the IClassFactory.CreateInstance method, the device object function intercepting module 315 can intercept the driver object method which exports the table of driver functions. When the print spooler 307 fetches the table, the device object function intercepting module 315 replaces the entries of interest with print DLP manager 101 functions.

The specific device object print functions to intercept can vary between embodiments, but typically those associated with transmitting content to the printer 311 are intercepted, so that content being sent to the printer can be monitored to enforce specific DLP policies as desired. For example, the device object function intercepting module 315 can intercept device object print functions responsible for line and page level output to the printer 311, as well as relevant state management functions. In one embodiment, the device object function intercepting module 315 intercepts StartDoc, EndDoc, TextOut, SendPage, Start Banding and Next Band. StartDoc and EndDoc execute start and end of document state management. TextOut is used for capturing content within a page and sending it to a buffer. StartBanding and NextBand are used for identifying pre and post operations for TextOut which is called multiple times (specifically, after StartDoc is called, StartBanding and TextOut are called to send a line to the buffer, and NextBand and TextOut are then called within the context of a post processing acknowledgement; this call sequence is repeated until the page has been sent to the buffer one line at a time). SendPage sends a page of content from the buffer to the printer 311. It is to be understood that the names of the print functions that perform these functions, as well as the implementation details of pre and post processing operations, can vary, e.g., in different versions of Windows).

A text monitoring module 317 of the print DLP manager 101 monitors attempts to send text to the printer 311, which enables the performance of desired DLP functionality as described in greater detail below. It is to be understood that the monitored attempts to send text to the printer 311 are made at a print driver level, by intercepted device object print functions. In one embodiment, the text monitoring module 317 monitors text a page at a time, whenever SendPage (or an equivalent function) is called to send a page from the buffer to the printer 311. The above described device object print functions send text from a document to the buffer a line at a time, and from the buffer to the printer 311 a page at a time. Because the DLP analysis is performed on text being sent to the printer 311, in this embodiment the analysis is performed on a per page basis. In other scenarios, units of text other than pages could be sent to the printer 311 (e.g., different sized blocks depending upon the specific instantiation of the print functionality), and in such cases the text monitoring module 317 processes such blocks rather than pages.

In some instances, the data in the document processed by TextOut is in glyph format instead of text (e.g., in the case of a PDF file). A glyph is a binary representation of a picture of a character, part of a character or multiple characters. In order to perform DLP analysis on glyph content, the glyphs are converted to Unicode (or another coded character mapping). For example, there is a Windows service for converting a glyph to Unicode which the print DLP manager 101 can utilize for this purpose. More specifically, in one embodiment at runtime the print DLP manager 101 loads win32k.sys (the kernel GUI subsystem) into user mode, and uses its methods for font translation. In other embodiments, different implementations can be used for conversion of glyph to Unicode. In some embodiments, graphics formats other than glyph are converted to text for DLP analysis as desired.

The above described functionality enables monitoring of text being sent to the printer 311 at the level of the printer driver, below the specific application 303 that initiated the print operation. However, while this provides access to all content being printed, it does not identify application level information such as the application 303 and user that initiated the print operation. Print operations are intercepted in the print spooler 307, which executes in system context, while each actual monitored print operation is initiated by a user operating an application 303 in application context. Print is an asynchronous operation which can run in the background, so the print DLP manager 101 cannot simply assume that the application 303 that is active at the time the print operation occurs at a driver level is the application 303 that performed the print operation. For example, a user running one application 303 (e.g., a word processor) could print a document, save it, close or minimize the word processor, and open and be actively working with a different application 303 (e.g., a spreadsheet program) when the print job is being processed at the driver level. Because the application context information as well as the content being printed is used as part of the DLP analysis through the print operation (e.g., to monitor and block specific users from printing specific content according to a DLP policy 300), an application identifying module 319 of the print DLP manager 101 identifies the specific applications 303 which originate specific print operations. From an identified application 303 the rest of the relevant application context information (e.g., the user and permissions) can be determined, as described below.

In order to identify the specific application 303 that originated a print operation occurring at the driver level, the application identifying module 319 intercepts the relevant remote procedure call (RPC) processing functions (e.g., the RPC impersonation API). Print requests are made by applications 303 as RPCs. When the print spooler 307 receives an RPC call for a print request made by an application 303, the print spooler 307 impersonates the application to execute the print operation. In order to do this, the print spooler 307 makes an RPC impersonation call to print as the application 303. By intercepting the RPC impersonation API, the application identifying module 319 detects when the print spooler 307 makes an RPC impersonation print call. The application identifying module 319 reads the application ID that the print spooler 307 passed to the intercepted RPC impersonation print call, and thus identifies the application 303 that originated the specific print operation. From the application ID, the application identifying module 319 can determine additional application context information, such as the user ID and the specific DLP policy 300 pertaining to the user. In this way, content being sent to the printer 311 at the driver level by specific print operations can be matched to the originating application 303 and its associated user.

With both the identification of the originating application 303 and associated user for each page (or other sized block) of text sent to the printer 311 at the driver level, a policy applying module 321 of the print DLP manager 101 can enforce a DLP policy 300 or otherwise perform DLP analysis at any desired level of granularity through the print operation. For example, if a given user is restricted from printing certain content (e.g., specific confidential information such as social security numbers or the like), each page of text sent to the printer 311 in any operation initiated by that user is monitored for the specific content. If the user tries to print the restricted content, the attempt is detected and one or more actions can be taken according to the DLP policy 300 (e.g., block the attempted print operation, redact the restricted content but send non-restricted content to the printer 311, log the attempted operation, warn or otherwise alert the user (e.g., through a user interface), send a notification (e.g. email, text, etc.) to an administrator, block other operations for the user, etc.). It is to be understood that DLP analysis and enforcement can be performed through the print operation at any desired level of granularity (e.g., at the level of users, groups, departments, applications or types of applications, documents/files, specific content, specific context, etc.). It is further to be understood that the actual DLP analysis and enforcement can be performed in conjunction with or by the DLP endpoint agent 301. Note that based on the DLP policy 300, some users may be authorized to print any content without restriction, some not authorized to print at all, and others restricted from printing certain confidential information and/or from printing under certain circumstances or in certain contexts.

Using the above described functionality, when a print operation is detected at the driver level, the user and/or user application level context information is determined, and where appropriate according to the DLP policy 300, the content which the print operation attempts to send to the printer 311 is monitored and the DLP operations (e.g., analysis, enforcement, etc.) are applied as desired. In other words, the DLP policy 300 can be applied to every attempt to send text to the printer 311 at the print driver level, based on application level context information such as the user associated with the originating application, and the specific text that the operation is attempting to print.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for monitoring print operations and enforcing a data loss prevention policy on a computer, independently of specific applications executing on the computer that initiate print operations, and independently of a specific print interface used by the specific applications, the method comprising:
   monitoring for and detecting a print driver being loaded into a print spooler, further comprising using a print hook for intercepting a system function that loads print drivers into the print spooler;
   intercepting creation of a driver object created when the print driver is loaded into the print spooler;
   when the driver object creates device objects, intercepting device object print functions;
   monitoring attempts to send text to a printer at a print driver level, the monitored attempts being made by at least one intercepted device object function;
   for each specific monitored attempt to send specific text to the printer, identifying specific application level context information associated with a specific application that initiated a print operation that resulted in the specific monitored attempt; and
   applying a data loss prevention policy to monitored attempts to send specific text to the printer at the print driver level, the application of the data loss prevention policy to a specific monitored attempt taking into account specific identified application level context information and specific text of the specific monitored attempt, wherein applying a data loss prevention policy to monitored attempts to send specific text to the printer at the print driver level further comprises performing at least one action from a group consisting of:
   blocking an attempt to send content to the printer;
   redacting restricted content but sending non-restricted content to the printer;
   logging an attempt to send content to the printer;
   sending a notification to an administrator concerning an attempt to send content to the printer; and
   blocking additional operations for a user associated with an attempt to send content to the printer.

2. The method of claim 1 wherein intercepting a system function that loads print drivers into the print spooler further comprises:
   injecting a print hook into the print spooler; and
   intercepting, by the print hook, the system function that loads print drivers into the print spooler.

3. The method of claim 1 wherein intercepting a system function that loads print drivers into the print spooler further comprises:
   registering print hook code as a print driver; and
   when the print hook code is loaded into the print spooler as a print driver, intercepting the system function that loads print drivers into the print spooler, by the print hook code.

4. The method of claim 1 wherein intercepting a system function that loads print drivers into the print spooler further comprises:
   intercepting a Windows system function for loading drivers; and
   detecting loading of any print driver into the spooler, by the intercepted Windows system function.

5. The method of claim 1 wherein intercepting creation of a driver object created when the print driver is loaded into the print spooler further comprises:
   intercepting a method of the loaded print driver for retrieving a class object; and
   intercepting a method for creating an instance of an object, to hook the created driver object.

6. The method of claim 1 wherein intercepting device object print functions further comprises:
   when the print spooler is instantiating the driver object through a method for creating an instance of an object, intercepting a driver object method which exports a table of driver functions; and
   when the print spooler fetches the table, replacing specific table entries.

7. The method of claim 1 wherein intercepting device object print functions further comprises:
   intercepting device object print functions associated with transmitting content to the printer.

8. The method of claim 1 wherein intercepting device object print functions further comprises:
   intercepting device object print functions responsible for line and page level output to the printer; and
   intercepting at least one device object print function responsible for state management functions.

9. The method of claim 1 wherein intercepting device object print functions further comprises:
   intercepting device object print functions for executing start and end of document state management, capturing content and sending it to a buffer, identifying pre and post capturing and buffering operations, and sending content from the buffer to the printer.

10. The method of claim 1 wherein monitoring attempts to send text to a printer at a print driver level further comprises:
    monitoring text a page at a time, whenever an intercepted device object print function is called to send a page to the printer.

11. The method of claim 1 further comprising:
    responsive to content being processed by an intercepted device object print function being in glyph format, converting glyphs to Unicode.

12. The method of claim 1 wherein identifying specific application level context information associated with a specific application that initiated a print operation that resulted in the specific monitored attempt further comprises:
    intercepting a remote procedure call impersonation application program interface;
    detecting the print spooler making a remote procedure call impersonation print call; and reading an application identifier the print spooler passed to the intercepted remote procedure call impersonation print call.

13. The method of claim 1 wherein identifying specific application level context information associated with a specific application that initiated a print operation that resulted in the specific monitored attempt further comprises:
   identifying a user associated with the specific application that initiated the print operation that resulted in the specific monitored attempt.

14. The method of claim 1 wherein a specific print interface used by at least one specific application that initiated at least one print operation that resulted in at least one specific monitored attempt to send text to the printer further comprises:
   Graphics Device Interface.

15. The method of claim 1 wherein a specific print interface used by at least one specific application that initiated at least one print operation that resulted in at least one specific monitored attempt to send text to the printer further comprises:
   Extensible Markup Language Paper Specification.

16. The method of claim 1 wherein a specific print interface used by at least one specific application that initiated at least one print operation that resulted in at least one specific monitored attempt to send text to the printer further comprises:
   Document Package.

17. At least one non-transitory computer readable-storage medium for monitoring print operations and enforcing a data loss prevention policy on a computer, independently of specific applications executing on the computer that initiate print operations, and independently of a specific print interface used by the specific applications, the at least one non-transitory computer readable-storage medium storing computer executable instructions that, when loaded into computer memory and executed by at least one processor of a computing device, cause the computing device to perform the following steps:
   monitoring for and detecting a print driver being loaded into a print spooler, further comprising using a print hook for intercepting a system function that loads print drivers into the print spooler;
   intercepting creation of a driver object created when the print driver is loaded into the print spooler;
   when the driver object creates device objects, intercepting device object print functions;
   monitoring attempts to send text to a printer at a print driver level, the monitored attempts being made by at least one intercepted device object function;
   for each specific monitored attempt to send specific text to the printer, identifying specific application level context information associated with a specific application that initiated a print operation that resulted in the specific monitored attempt; and
   applying a data loss prevention policy to monitored attempts to send specific text to the printer at the print driver level, the application of the data loss prevention policy to a specific monitored attempt taking into account specific identified application level context information and specific text of the specific monitored attempt, wherein applying a data loss prevention policy to monitored attempts to send specific text to the printer at the print driver level further comprises performing at least one action from a group consisting of:
   blocking an attempt to send content to the printer;
   redacting restricted content but sending non-restricted content to the printer;
   logging an attempt to send content to the printer;
   sending a notification to an administrator concerning an attempt to send content to the printer; and
   blocking additional operations for a user associated with an attempt to send content to the printer.

18. The at least one non-transitory computer readable-storage medium method of claim 17 wherein intercepting a system function that loads print drivers into the print spooler further comprises:
   injecting a print hook into the print spooler; and
   intercepting, by the print hook, the system function that loads print drivers into the print spooler.

19. The at least one non-transitory computer readable-storage medium method of claim 17 wherein intercepting a system function that loads print drivers into the print spooler further comprises:
   registering print hook code as a print driver; and
   when the print hook code is loaded into the print spooler as a print driver, intercepting the system function that loads print drivers into the print spooler, by the print hook code.

20. A computer system for monitoring print operations and enforcing a data loss prevention policy, independently of specific applications that initiate print operations, and independently of a specific print interface used by the specific applications, the computer system comprising:
   at least one processor;
   system memory;
   a print driver load detecting module residing in the system memory, the print driver load detecting module being programmed to monitor for and detect a print driver being loaded into a print spooler, further comprising using a print hook for intercepting a system function that loads print drivers into the print spooler;
   a print driver intercepting module residing in the system memory, the print driver intercepting module being programmed to intercept creation of a driver object created when the print driver is loaded into the print spooler;
   a device object function intercepting module residing in the system memory, the device object function intercepting module being programmed to intercept device object print functions, when the driver object creates device objects;
   a text monitoring module residing in the system memory, the text monitoring module being programmed to monitor attempts to send text to a printer at a print driver level, the monitored attempts being made by at least one intercepted device object function;
   an application identifying module residing in the system memory, the application identifying module being programmed to identify, for each specific monitored attempt to send specific text to the printer, specific application level context information associated with a specific application that initiated a print operation that resulted in the specific monitored attempt; and
   a policy applying module residing in the system memory, the policy applying module being programmed to apply a data loss prevention policy to monitored attempts to send specific text to the printer at the print driver level, the application of the data loss prevention policy to a specific monitored attempt taking into account specific identified application level context information and specific text of the specific monitored attempt, wherein applying a data loss prevention policy to monitored attempts to send specific text to the printer at the print driver level further comprises performing at least one action from a group consisting of:
blocking an attempt to send content to the printer;
redacting restricted content but sending non-restricted content to the printer;
logging an attempt to send content to the printer;
sending a notification to an administrator concerning an attempt to send content to the printer; and
blocking additional operations for a user associated with an attempt to send content to the printer.

* * * * *